(12) United States Patent
Rabson

(10) Patent No.: US 12,275,462 B2
(45) Date of Patent: Apr. 15, 2025

(54) DIFFERENTIAL SWERVE DRIVE

(71) Applicant: Gideon Louis Rabson, Newton, MA (US)

(72) Inventor: Gideon Louis Rabson, Newton, MA (US)

( * ) Notice: Subject to any disclaimer, the term of this patent is extended or adjusted under 35 U.S.C. 154(b) by 617 days.

(21) Appl. No.: 17/704,770

(22) Filed: Mar. 25, 2022

(65) Prior Publication Data

US 2023/0303154 A1 Sep. 28, 2023

(51) Int. Cl.
*B62D 5/04* (2006.01)

(52) U.S. Cl.
CPC ......... *B62D 5/0403* (2013.01); *B62D 5/0418* (2013.01)

(58) Field of Classification Search
CPC ............................. B62D 5/0403; B62D 5/0418
See application file for complete search history.

(56) References Cited

U.S. PATENT DOCUMENTS

| | | |
|---|---|---|
| 9,174,338 B2 | 11/2015 | Ouellet |
| 10,251,805 B2 | 4/2019 | Morbi et al. |
| 11,046,515 B2 | 6/2021 | Luckinbill et al. |
| 11,098,854 B2 | 8/2021 | Carrasco Zanini et al. |

FOREIGN PATENT DOCUMENTS

| | | | | |
|---|---|---|---|---|
| CN | 115402089 A | * | 11/2022 | ........... B60K 17/046 |
| EP | 1725415 B1 | * | 4/2008 | ........... B60K 7/0007 |
| WO | WO-2010039102 A1 | * | 4/2010 | ......... B60B 33/0039 |

OTHER PUBLICATIONS

2x Neo 550 Differential Swerve (2.845lbs) (Jan. 2020) https://www.chiefdelphi.com/t/2x-neo-550-differential-swerve-2-845lbs/374565.
Pic: Differential Swerve Module (971) (Sep. 2017) https://www.chiefdelphi.com/t/pic-differential-swerve-module-971/160525.

* cited by examiner

*Primary Examiner* — Jacob D Knutson
(74) *Attorney, Agent, or Firm* — Farber LLC; Fritz L. Schweitzer, III

(57) ABSTRACT

A differential swerve drive has a carriage that pivots about a pivot axis relative to a base. A drive wheel is rotationally connected to the carriage. A planetary gear system includes a sun gear, a ring gear, a carrier, and at least one planet clear which is pivotally supported by the carrier and is disposed between and meshes with the sun gear and the ring gear. The carrier is fixed relative to the carriage, and an orbiting movement of the planet gear causes a pivoting movement of the carriage, Rotation of the planet gear about a planet axis causes rotation of the drive wheel. A first motor drives the sun gear; and a second motor drives the ring gear.

5 Claims, 8 Drawing Sheets

DIFFERENTIAL SWERVE DRIVE

FIELD OF THE INVENTION

The invention pertains to the field of omnidirectional drive systems, and in particular, differential swerve drives.

BACKGROUND OF THE INVENTION

A problem faced by many omnidirectional drive systems is that they tend not to have great traction. This is generally due to a combination of limited contact area with the ground and only being able to exert forces in certain directions (such as with omni wheels or mecanum drives). In robotics applications, where both maneuverability and pushing power are often required, a possible solution to this has been a swerve drive. By rotating traction wheels about a vertical axis, a swerve drive combines the pushing power of a simple tank drive with omnidirectional movement. This comes at the cost of additional mechanical and computational complexity.

Among the disadvantages of a swerve drive is the fact that it requires additional motors to drive compared to other sorts of omnidirectional drive systems. This is because each wheel requires one motor to control the orientation of the module and one to spin the wheel. In the case that there are a limited number of power or control ports available, this can limit possibilities for what other mechanisms can be used on the robot. To help counteract this disadvantage, people have developed differential swerve drives. Instead of having one small motor to orient the module and a larger one to spin the wheel, differential swerves use differential gearing so that two motors can work together to both orient and spin the module. This serves to maximize driving power given the power and/or connection ports used.

In a differential swerve, the differential is most commonly built using epicyclic gearing. This can be thought of as the key pinion in the system having two degrees of freedom. It can both orbit the central vertical axis of the swerve module (controlling orientation or azimuth) and it can rotate around its own central axis (controlling the spin of the wheel). In order to control these two degrees of freedom, the pinion needs two linearly independent inputs, one from each motor. Two main approaches to this have developed. The first is using combination ring-bevel gears. However, this sort of design requires advanced manufacturing capabilities and therefore isn't practical in many use cases. The other approach has generally been to use planetary gearing built up in multiple layers. These are most commonly driven using ring gears with both internal and external teeth. These designs quickly inflate in mass and size.

Therefore, what is desired is omnidirectional drive system that is easy to manufacture, and that is lightweight and compact.

SUMMARY OF THE INVENTION

The design of the present invention solves the manufacturing difficulties of prior designs by enabling the use of readily-available, off-the-shelf gears. It does this through the use of a novel planetary gearbox. One input to the pinion comes from the sun gear and the other from the ring gear. As a result, this sacrifices the symmetric nature the two motors have in the other designs where they both have the same drive ratio between controlling orientation and wheel rotation. However, the improvements in compactness and simplicity make this design much more accessible.

In one embodiment, the system includes a base, a carriage connected to the base, a drive wheel connected to the carriage, and a flat planetary gearbox having a sun gear, one or more planet gears, and ring gear. One planet gear is that key pinion that spins the drive wheel, although all the planets move together. When the planet gear or gears orbit the sun gear, they cause the carriage to pivot relative to the base, providing a degree of freedom to control the azimuth of the drive wheel.

An axle of one of the planets is connected to the drive wheel such that rotation of the planet or planets around their own axes causes rotation (spin) of the drive wheel. This connection can include bevel gearing, although other connections are contemplated.

The system can include two motors. The input from the first motor goes into the sun gear, and the input from the second motor goes into the ring gear. The first motor drives a sun axle connected to the sun gear, for example via a first belt, and the second motor drives an outside of the ring gear, for example via a second belt.

In an embodiment, the differential swerve drive has a base and a carriage pivotally connected to the base, and the carriage is operable to pivot about a pivot axis relative to the base. A drive wheel is operable to roll on a support surface, and is rotationally connected to the carriage. The drive wheel is operable to rotate about a rotation axis relative to the carriage, and the rotation axis of the drive wheel is perpendicular to the pivot axis of the carriage.

The swerve drive includes a planetary gear system including a sun gear, a ring gear, a carrier, and at least one planet gear, and the planet gear is pivotally supported by the carrier and is disposed between and meshes with the sun gear and the ring gear. The sun gear, ring gear and carrier are rotatable relative to the base and each has an axis of rotation relative to the base which is common to the pivot axis of the carriage.

The carrier is fixed relative to the carriage, and an orbiting movement of the planet gear around the sun gear causes a pivoting movement of the carriage about the pivot axis relative to the base.

The planet gear has a planet axle and is operable to pivot about a planet axis relative to the carrier, and the planet axle is connected to the drive wheel, and rotation of the planet gear about the planet axis causes rotation of the drive wheel about the rotation axis of the drive wheel.

A first motor fixed relative to the base and operable to drive the sun gear; and a second motor fixed relative to the base and operable to drive the ring gear.

DETAILED DESCRIPTION OF THE INVENTION

Figure 1A:
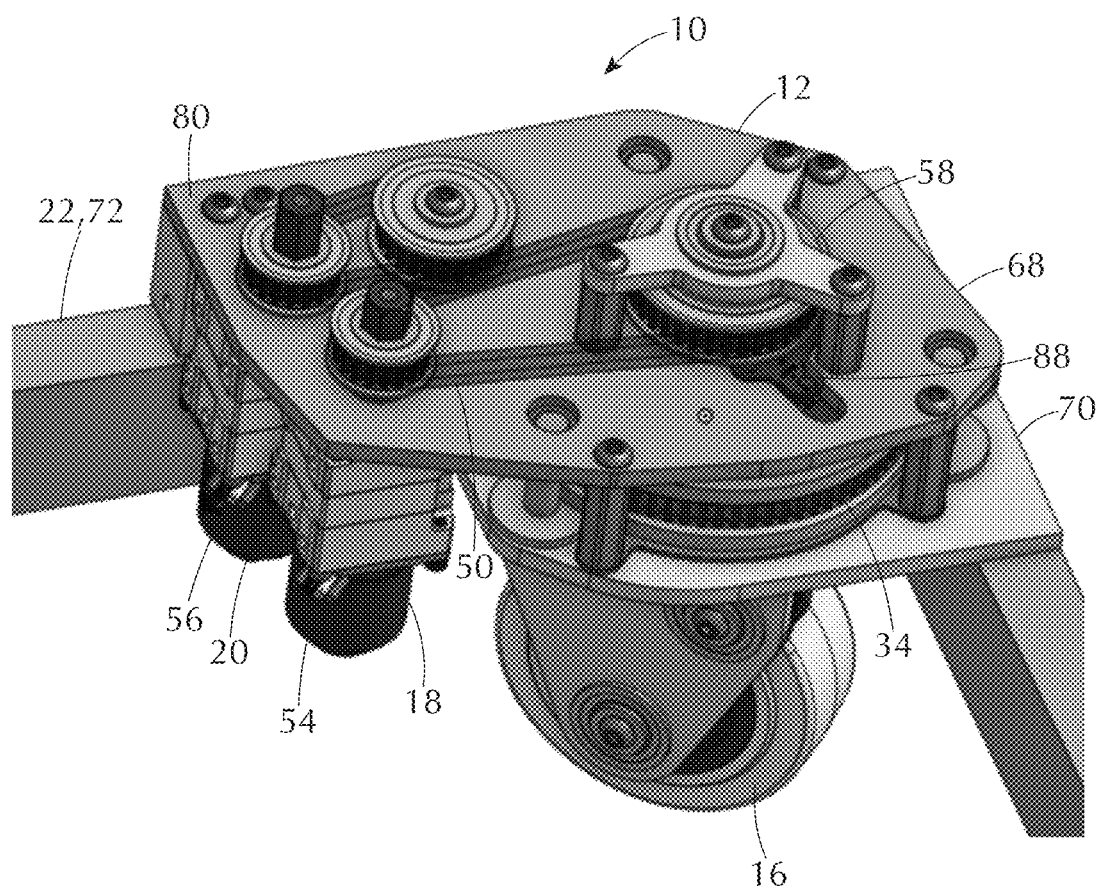
FIG. 1A is a perspective view of a preferred embodiment of the differential swerve drive of the present invention.
Figure 1B:
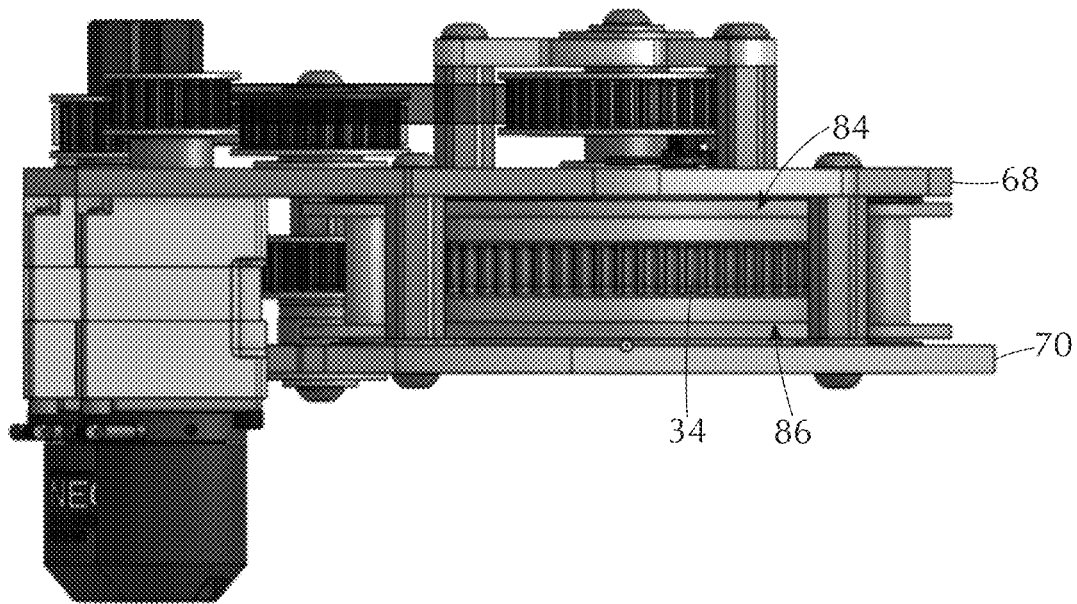
FIG. 1B is a side view of the differential swerve drive of FIG. 1A.
Figure 2A:
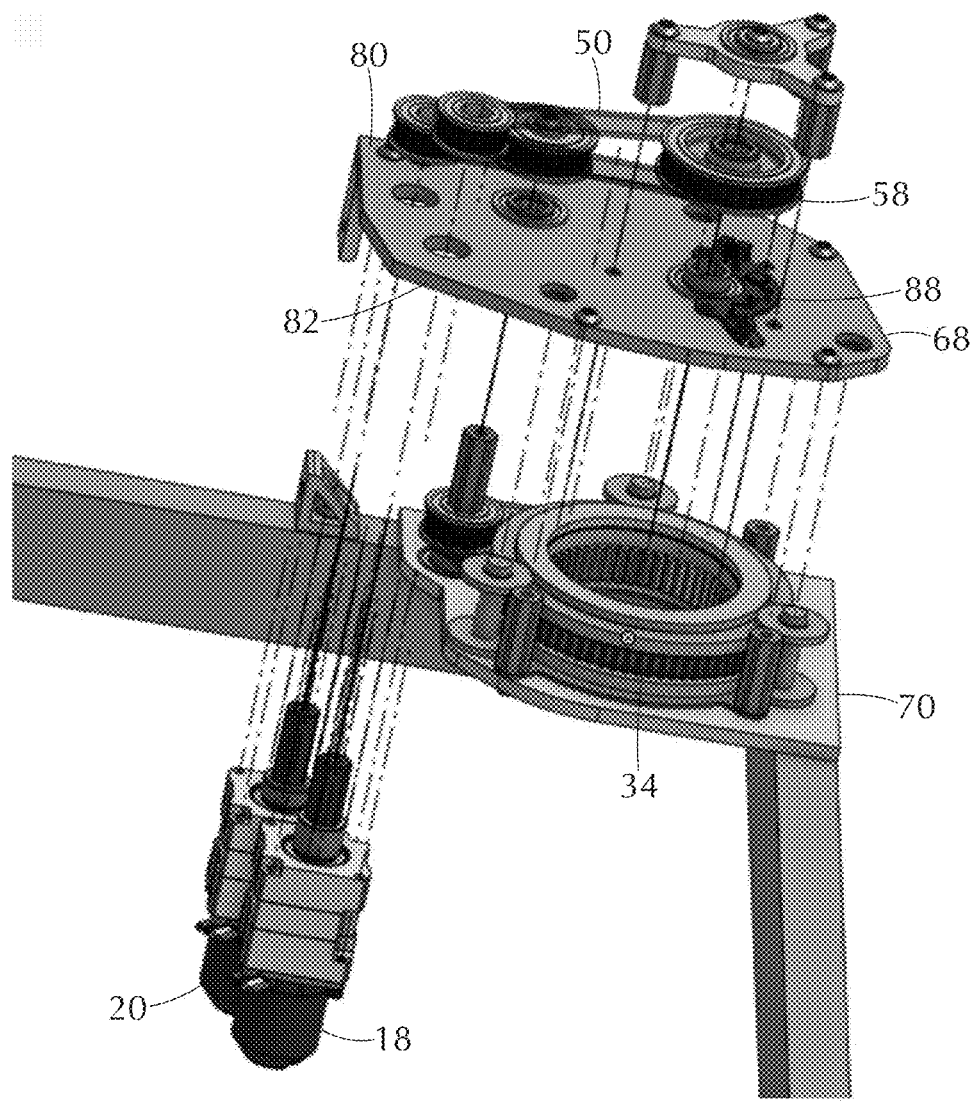
FIGS. 2A and 2B are exploded views of the differential swerve drive of FIG. 1A, showing a configuration of the power input system.
Figure 2B:
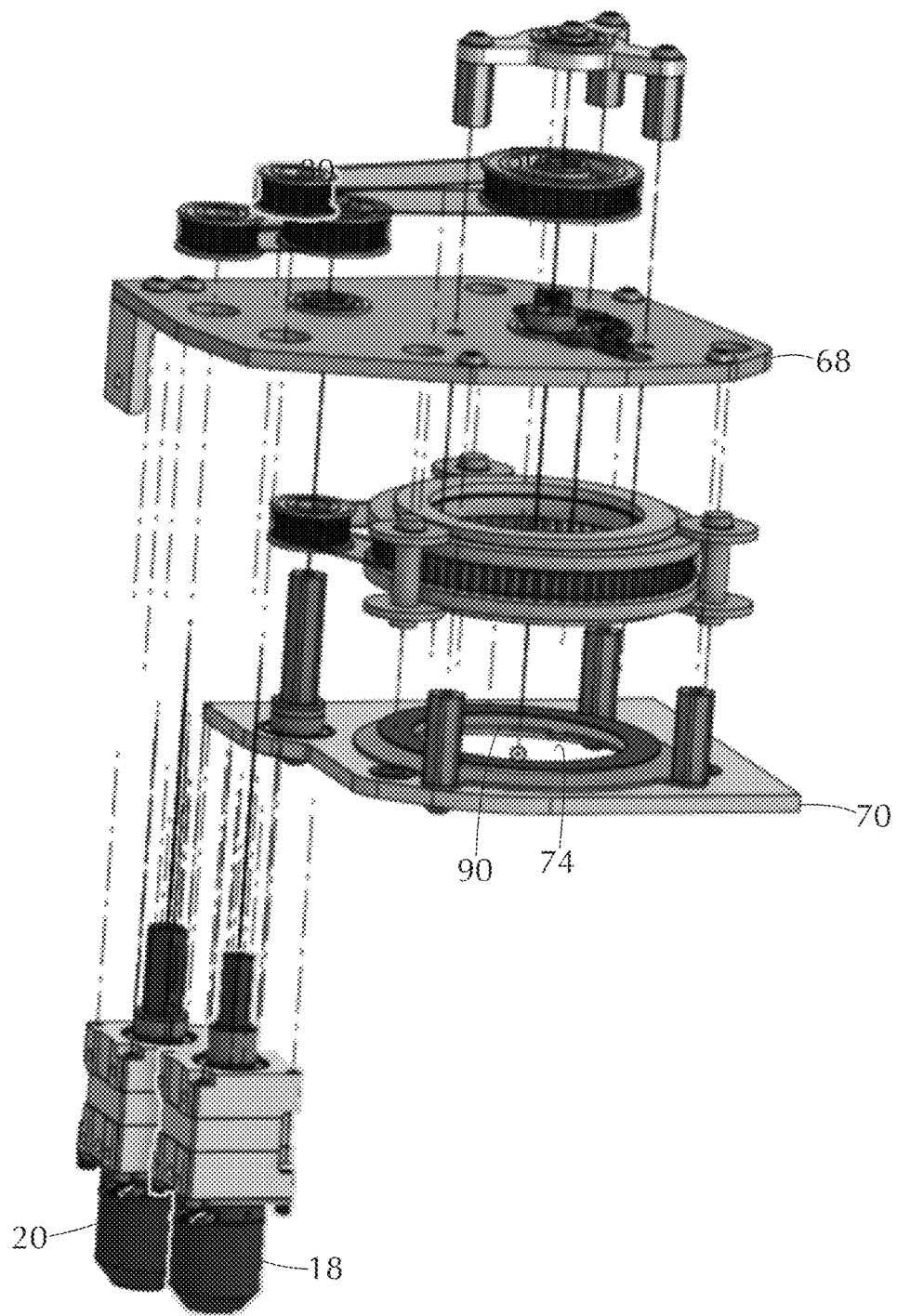
Figure 3:
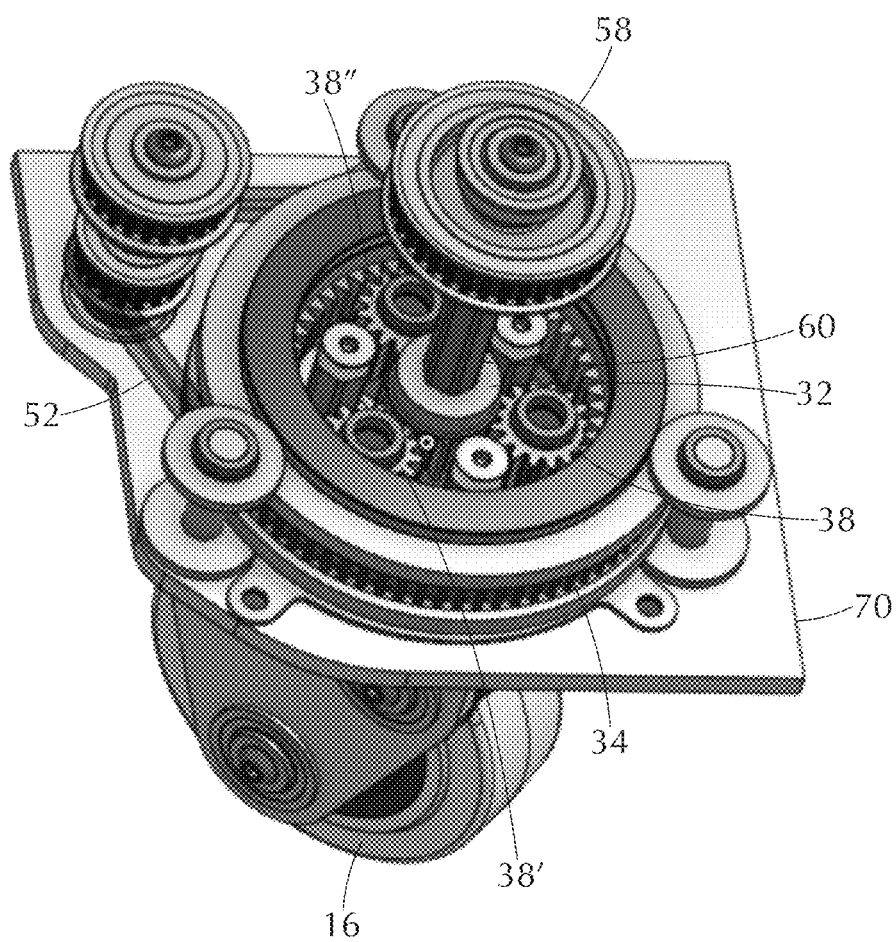
FIG. 3 is an exploded view of the differential swerve drive of FIG. 1A, showing a partial configuration of the planetary gear system.
Figure 4A:
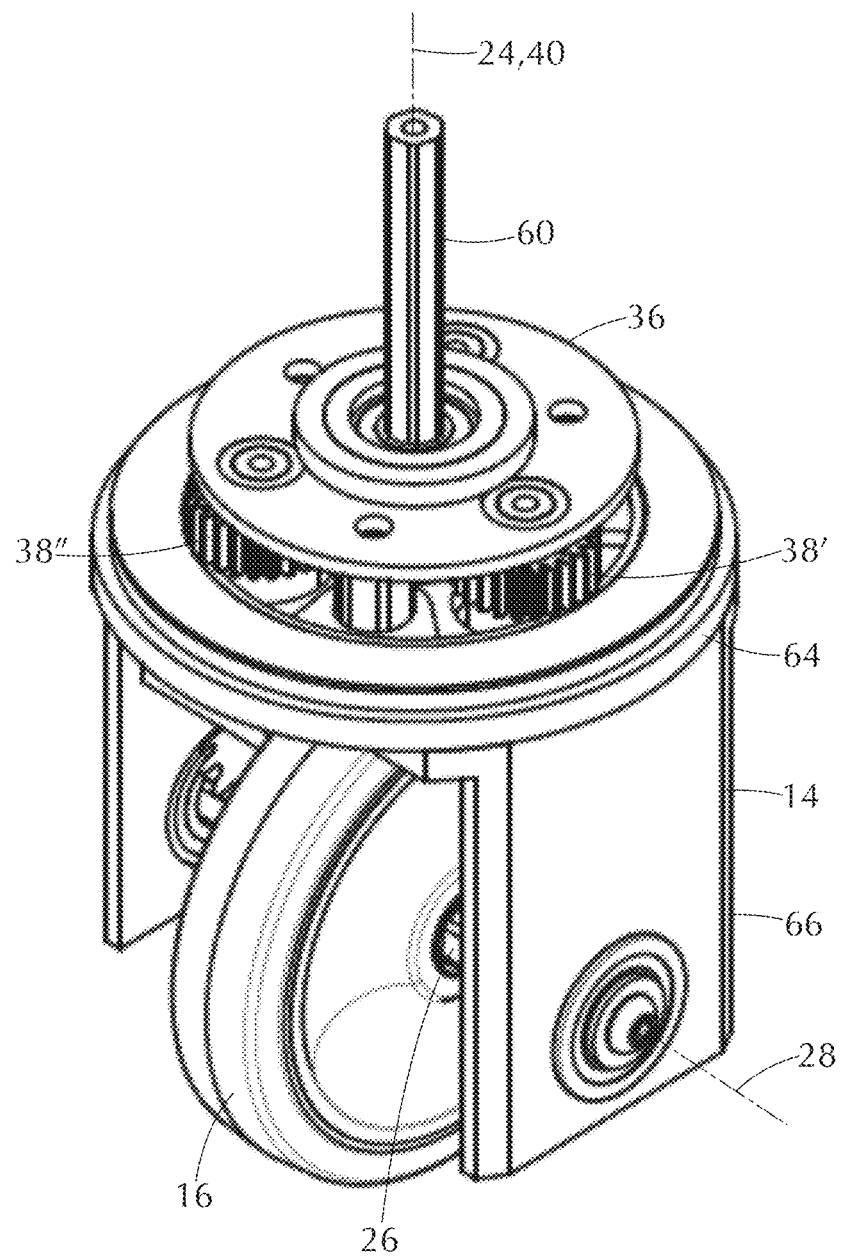
FIG. 4A is a partial perspective view of components of the differential swerve drive of FIG. 1A.
Figure 4B:
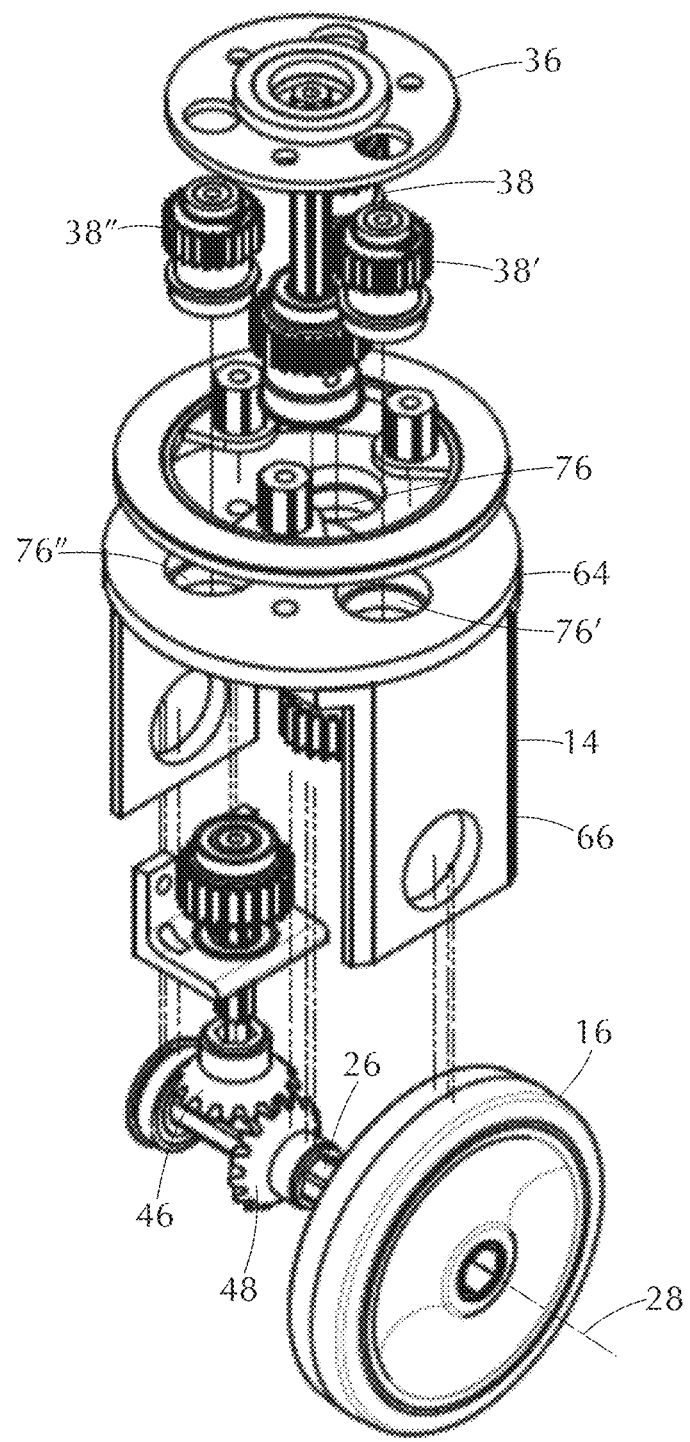
FIG. 4B is an exploded perspective view of the components shown in FIG. 4A.
Figure 4C:
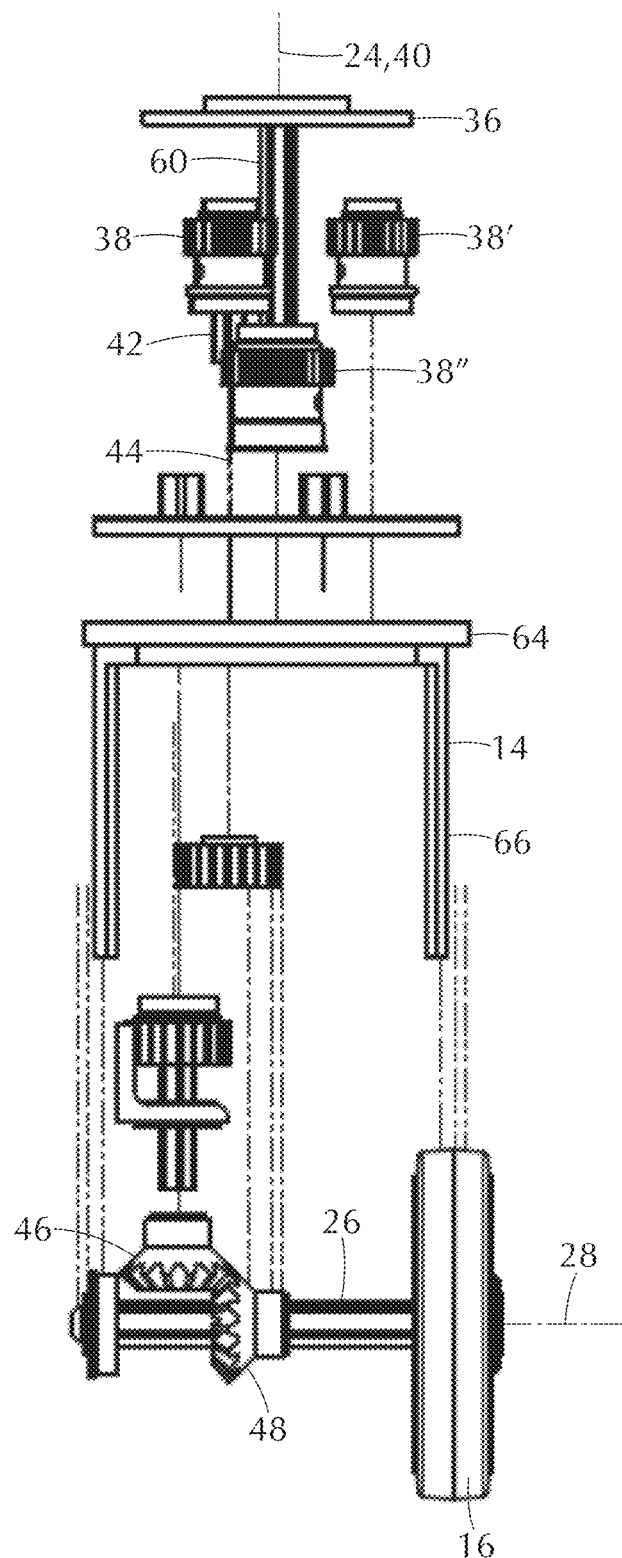
FIG. 4C is an exploded elevation view of the components shown in FIG. 4A.

Referring to FIGS. 1-4C, a preferred embodiment of the differential swerve drive 10 is suitable for omnidirectional transportation of a load 22, and is particularly suitable for robotics applications. It is intended that one or more such swerve drives 10 can be provided for a load 22 and can be controlled by one or more electronic controllers (not shown).

The swerve drive 10 can include a base 12, a carriage 14, a drive wheel 16 and a pair of motors 18, 20. The base 12 can connect to a load 22 to mount the swerve drive 10 to the load 22. For example, the load 22 can include a frame 72 to which the base 12 of the swerve drive 10 is mounted.

The base 12 of the swerve drive 10 can include a first plate 68 and a second plate 70, and one or both of the first and second plates 68, 70 can be connected to the load 22 and/or frame 72 thereof.

The first plate 68 can include a flange portion 80 extending laterally outwardly (e.g., typically horizontal). The first and second motors 18, 20 can be mounted to a bottom surface 82 of the flange portion 80 (where the bottom surface faces the support surface) and the motors can extend toward the support surface. In this configuration, rotational axes of each motor 18, 20 is typically vertical.

The carriage 14 is pivotally connected to the base 12 and is operable to pivot about a pivot axis 24 relative to the base 12, to change the direction (i.e., azimuth) of the carriage 14 and the drive wheel 16 connected thereto. Preferably, the carriage 14 is constrained, relative to the base 12, to pivot about the pivot axis 24 of the carriage 14.

The pivot axis 24 of the carriage 14 is perpendicular to a support surface (not shown) on which the drive wheel 16 rolls. Typically, the support surface is horizontal, in which case the pivot axis 24 of the carriage 14 will be vertical.

The drive wheel 16 is rotationally connected to the carriage 14, for example by a wheel axle 26, and is operable to rotate about a rotation axis 28 relative to the carriage 14, which can be perpendicular to the pivot axis 24 of the carriage. Preferably, the drive wheel 16 is constrained, relative to the carriage 14, to pivot about the rotation axis 28 of the drive wheel 16.

The drive wheel 16 is load-bearing, and is operable to roll on the support surface (not shown) and to support the swerve drive 10 and load 22 connected thereto above the support surface. The rotation axis 28 of the drive wheel 26 is parallel to the support surface. So, where the support surface is horizontal, the rotation axis 28 is also horizontal.

The swerve drive 10 includes a planetary gear system having a sun gear 32, a ring gear 34, a carrier 36, and one or more (e.g., three) planet gears 38, 38', 38". Each planet gear 38, 38', 38" is pivotally supported by the carrier 36 and is disposed between and meshes with the sun gear 32 and the ring gear 34.

The sun gear 32, ring gear 34 and carrier 34 are each rotatable relative to the base 12 and each has an axis of rotation 40 relative to the base 12 which is common to the pivot axis 24 of the carriage 14.

The carrier 36 is fixed relative to the carriage 14, and an orbiting movement of the planet gears 38, 38', 38" around the sun gear 32 causes a pivoting movement of the carriage 14 relative to the base 12. Thus, such orbiting movement of the planet gears 38, 38', 38" causes an equal pivoting movement of the drive wheel 16 to change direction of the drive wheel.

At least one planet gear 38 has a planet axle 42 and is operable to pivot about a planet axis 44 relative to the carrier 36, and the planet axle 42 is connected to the drive wheel 16, such that rotation of the planet gear 38 about the planet axis 44 causes rotation of the drive wheel 16 about the rotation axis 28 of the drive wheel 16. Thus, rotation of the planet gear 38 and planet axle 42 about the planet axis 44 causes the drive wheel to spin, which will, in turn, cause the load 22 to move across (or relative to) the support surface.

For example, the planet axle 42 can be mechanically connected to the wheel axle 26, such as by one or more bevel gears 46, 48, Additionally, or alternatively, the planet axle 42 can be connected to the drive wheel 16 by one or more gears and/or belts (not shown) and/or a contact (or friction) drive.

The planetary gear system is preferably "flat" or substantially flat such that at least portions of the sun gear 32, planet gears 38, 38', 38" and ring gear 34 lie in a common plane.

The first motor 18 is operable to drive the sun gear 32, for example via a first belt 50 which drives a sun pully 58 connected to the sun gear 32 via a sun axle 60. The second motor 20 is operable to drive the ring gear 34, for example via a second belt 52 which engages an outer diameter 62 of the ring gear 34.

Each motor is preferably an electronic motor with power and/or control inputs 54, 56 which can connect to one or more controllers (not shown). Each motor can have the same or substantially the same characteristics, for example the same size and power/speed output.

The carriage 14 can include a platform 64, which can be substantially planar and disc-shaped (e.g., circular), and the carrier 36 can be fixed to the platform 64. The second plate 70 can include an opening 74 sized and shaped to closely receive the platform 64 of the carriage 14. For example, the opening 74 can be circular. The opening 74 preferably forms a bushing surface 90 against which the platform 64 bears to constrain movement of the platform 64 and carriage 14.

The platform 64 of the carriage 14 can include one or more openings or recesses 76, 76', 76", and a portion of one or more planet gears 38, 38', 38" can extend into an associated opening or recess, for example journal bearings on a first end of the associated planet axle. Preferably, each opening or recess 76, 76', 76" is circular and closely receives the associated portion of the planet gears 38, 38', 38' therein.

Likewise, the carrier 36 can include one or more openings or recesses 78, 78', 78", and a portion of one or more planet gears 38, 38', 38" can extend into an associated opening or recess, for example journal bearings on a second end of the associated planet axle. Preferably, each opening or recess 78, 78', 78" is circular and closely receives the associated portion of the planet gears 38, 38', 38" therein.

Thus, the carrier 36 and platform 64 constrain the planet gears 38, 38', 38" such that the rotation of the planets around the sun gear 32 is transferred to the carriage 14 and drive wheel 16. Additionally, they serve to transmit a portion of any external forces to which the drive wheel 16 and carriage 14 are subjected through to the sun axle 60 supporting the sun gear 32. Combined with the bushing surface 90 between platform 64 of the carriage 14 and opening 74 of the second plate 70 of the base 12, these create reaction forces for external moments.

The carriage 14 can also include a wheel fork 66 extending from the platform 64 parallel to the pivot axis 24 of the carriage 14, in a direction away from the carrier 36 (typically vertically downwardly). The drive wheel 16 can be rotationally supported by the wheel fork 66, on one or both sides of the drive wheel 16. For example, the wheel axle 26 of the drive wheel 16 can be supported by the wheel fork 66.

The sun shaft axle 60 is preferably in axial tension, and the ring gear 34 is in axial compression. Preferably, first and second (e.g., top and bottom) annular (i.e., ring-shaped) thrust bearings 84, 86 are disposed above and below the ring gear 34, respectively, to allow for rotation of the ring gear 34 between the first and second plates 68, 70 of the base 12. In particular, the first thrust bearing 84 can be disposed between the ring gear 34 and the first plate 68 of the base 12, and the second thrust bearing 86 can be disposed between the ring gear 34 and the second plate 70 of the base 12.

The system also preferably includes a rotary encoder 88 (or other similar device) that serves as an input to the control system. The rotary encoder 88 is operable to detect the angular position of the carriage 14 relative to the base 12. The control system uses the input from the encoder to adjust the azimuth of the carrier so that the wheel will drive in the intended direction. It is preferable that the encoder 88 is an absolute encoder to ensure that knowledge of the position is not lost due to a loss of power.

What is claimed is:

1. A differential swerve drive, comprising:
   a base;
   a carriage pivotally connected to the base, and the carriage being operable to pivot about a pivot axis relative to the base;
   a drive wheel operable to roll on a support surface, the drive wheel being rotationally connected to the carriage and being operable to rotate about a rotation axis relative to the carriage, and the rotation axis of the drive wheel being perpendicular to the pivot axis of the carriage;
   a planetary gear system including a sun gear, a ring gear, a carrier, and at least one planet gear, and the planet gear being pivotally supported by the carrier and being disposed between and meshing with the sun gear and the ring gear;
   the sun gear, ring gear and carrier each being rotatable relative to the base and each having an axis of rotation relative to the base which is common to the pivot axis of the carriage;
   the carrier being fixed relative to the carriage such that the carriage pivots about the pivot axis with the carrier, and an orbiting movement of the planet gear and carrier around the sun gear causing a pivoting movement of the carriage and the drive wheel about the pivot axis relative to the base;
   the planet gear having a planet axle and being operable to pivot about a planet axis relative to the carrier, and the planet axle being connected to the drive wheel, and rotation of the planet gear about the planet axis causing rotation of the drive wheel about the rotation axis of the drive wheel;
   a first motor fixed relative to the base and operable to drive the sun gear; and
   a second motor fixed relative to the base and operable to drive the ring gear.

2. The differential swerve drive, as in claim 1, wherein:
   the first and second motors are of substantially the same size and power.

3. The differential swerve drive, as in claim 1, wherein:
   at least portions of the sun gear, planet gear and ring gear lie in a common plane.

4. The differential swerve drive, as in claim 2, wherein:
   each of the sun gear, planet gear and ring gear have a common height in a direction parallel to the pivot axis of the carriage.

5. The differential swerve drive, as in claim 3, wherein:
   all portions of the sun gear, planet gear and ring gear lie between upper and lower planes perpendicular to the pivot axis of the carriage.

* * * * *